J. G. FISCHER.
PULLEY.
APPLICATION FILED JULY 22, 1919.

1,400,671.

Patented Dec. 20, 1921.

INVENTOR.
JOHN G. FISCHER,
BY Andrew B. Remick
HIS ATTORNEY.

UNITED STATES PATENT OFFICE.

JOHN G. FISCHER, OF WATERLOO, ILLINOIS, ASSIGNOR TO ANDREW B. REMICK, OF ST. LOUIS, MISSOURI.

PULLEY.

1,400,671.      Specification of Letters Patent.      Patented Dec. 20, 1921.

Application filed July 22, 1919. Serial No. 312,511.

*To all whom it may concern:*

Be it known that I, JOHN G. FISCHER, a citizen of the United States, and residing at Waterloo, Illinois, have invented the new and useful Improvement in Pulleys, of which the following is a specification.

This invention relates to pulleys.

In the operation of ordinary pulleys, a film of air is carried around with the belt, and while this film is partially squeezed out as the belt passes over the pulleys, it causes considerable slip. In some establishments the air in the neighborhood of the belt and pulleys contains considerable dust, and if this dust settles on the belt and is squeezed between the belt and the pulleys, it forms a smooth coating on the pulley engaging face of the belt, thereby causing the coefficient friction to be reduced to a considerable extent.

It has been attempted to overcome some of these objectionable features by perforating the pulley ring; however, this does not accomplish the desired results, since the air between the perforations will not be completely squeezed out. Moreover, the perforation or passages will soon clog up, especially where dust is present in the air in the neighborhood of the belt and pulley.

One of the objects of this invention, therefore, is to provide a pulley constructed to eliminate the air film and maintain such elimination and thereby prevent slip.

Another object is to provide a pulley having provision for not only disposing of the dust on the pulley engaging face of the belt, but also to eliminate such dust.

Another object is to provide a pulley which not only provides for the positive elimination of an air film and dust between the pulley and belt, but also provides for the positive increase of the grip of the belt with respect to the pulley.

Figure 1:
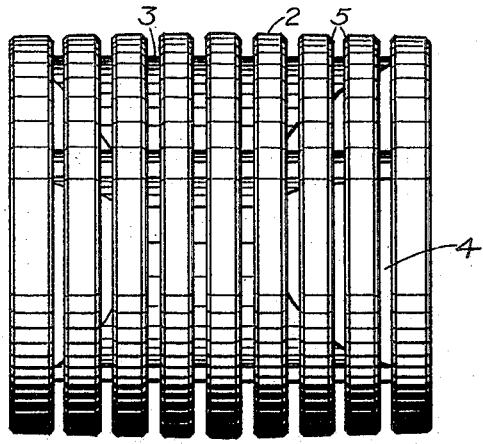
Figure 2:
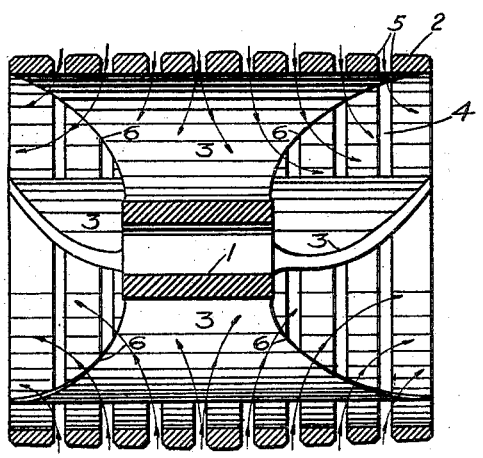
Figure 3:
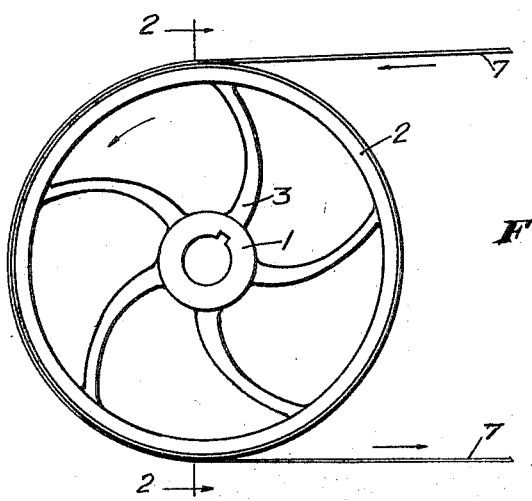

Further objects will appear from the detailed description taken in connection with the accompanying drawing, in which Figure 1 is an elevation of a pulley embodying this invention; Fig. 2 is a section on the line 2—2, Fig. 1; and Fig. 3 is an end elevation.

Referring to the accompanying drawing, 1 designates the hub and 2 the rim of a pulley connected by spokes 3. The rim is provided with a series of circumferential grooves 4, extending therethrough and widened at the extreme circumference by beveling the rings formed by cutting the grooves as shown at 5. The spokes or arms 3 extend forwardly in the direction of the rotation of the pulley Fig. 3 and since the hub is of considerable less length than the length of the rim, the arms or spokes decrease rapidly in width from the rim to the hub.

There is thus provided a pulley having a perforated rim with spokes forming internal blades directed in the direction of rotation of the pulley. It will be noted that, except at the hub, these blade-spokes have inner edges 6, and the effective radial depths of the blades increase from the ends of the rim to the hub.

Assuming that the pulley rotates in the direction of the arrow 3, and that the belt moves in the direction of the arrow under the pulley; the portion of the spokes 3 adjacent the rim are directed forwardly in the direction of rotation, and form internal vanes to throw the air centripetally, and due to the construction of these vane spokes, as heretofore described, the air is caused to flow through the air passages inwardly in a radial direction and then outwardly at both ends of the pulley as shown by arrows Fig. 2. During the rotation of the pulley, therefore, the air is caused to flow inwardly through the air passages in the rim, and is expelled at both ends of the pulley in axial directions. This flow of air takes place over the entire pulley surface. When now, any portion of the belt approaches the pulley surface, any dust accumulated thereon, will not only be driven inwardly, and expelled at the sides of the pulley, but the air in the neighborhood of the belt face will also be caused to flow inside of the pulley. The result is, therefore, that as soon as any portion of the belt comes in contact with the rim face, the air on the belt will have become exhausted into the pulley, so that when the belt portion engages the pulley face, all air will have been exhausted from between the belt and the pulley face, so that there is a direct gripping contact between the belt and the rim. Moreover due to the flow of air, there will be, in fact, a lower air pressure on the belt face of the rim, than on the inner face thereof; accordingly the belt in engagement with the pulley will be subject to a certain amount of pressure holding it in firm contact with the pulley rim.

It will, therefore, be seen that the invention accomplishes its objects. On account of the flow of air set up during the rotation of the pulley, the air film is not only eliminated, but this elimination is maintained; since at no time can these air passages clog; these air passages are consequently always open to perform their function. Since the air in the neighborhood of the belt and pulley is always in motion, the dust will be entirely eliminated before the belt leaves the pulley; accordingly, this dust will not pass between the belt and the pulley face so that both belt and pulley face are maintained clean with a maximum coefficient of friction.

It should be noted that the drive or rotation of the pulley of the construction shown is such that there is an inward flow of air at the rim and out at the side of the pulley. This is advantageous, since it not only takes the dust away from the belt and pulley face, but also cools adjacent bearings and prevents the oil from being drawn from the bearings and coming in contact with the belt, which would be the case if the drive or rotation of the pulley were reversed. It will, of course, be understood that the direction of rotation of the pulleys can be reversed, but in such a case, the current of air will flow outwardly, i. e., flow in from the side and pass out radially. While this has some of the advantages of this invention, in providing for maintaining clear the passages, and to a considerable extent discarding the dust from the belt by blowing action, and while such a construction and arrangement is within a broad scope of this invention, it will readily be seen that a structural operation, in which the air currents are caused to flow inwardly, is highly advantageous.

It is obvious that various changes may be made in the details of construction without departing from the spirit of this invention; it is, therefore, to be understood that this invention is not to be limited to the specific construction shown and described.

Having thus described the invention, what is claimed is:

1. A pulley, comprising, a perforated rim, and spokes adapted to form blades, so constructed as to cause air to flow inwardly through said perforations.

2. A pulley, comprising, a perforated rim, and spokes adapted to form blades which centripetally direct the air through said perforations, substantially as and for the purpose set forth.

3. A pulley, comprising a rim provided with air passages and spokes constructed and arranged to cause radial flow of air through said passages during the rotation of said pulley.

4. A pulley, comprising a rim having circumferential air passages extending completely around said rim, and blades arranged inside of and extending collectively along said rim.

5. A pulley, comprising a rim having circumferential air passages, and blades arranged inside of and extending collectively along said rim.

6. A pulley, comprising a rim composed of a series of rings provided with circumferential air passages, and means connecting the rings adapted to cause flow of air through said passages.

7. A pulley, comprising a rim composed of a series of rings provided with circumferential air passages, and blades connecting said rings.

8. A pulley, comprising a rim composed of a series of rings provided with circumferential air passages, and blades forming spokes connecting said rings.

In testimony whereof I affix my signature this 19th day of July, 1919.

JOHN G. FISCHER.